US012025477B2

(12) United States Patent
Hino et al.

(10) Patent No.: US 12,025,477 B2
(45) Date of Patent: Jul. 2, 2024

(54) OPTICAL FIBER SENSOR, AND MONITORING SYSTEM

(71) Applicant: NEC Corporation, Tokyo (JP)

(72) Inventors: Tomoyuki Hino, Tokyo (JP); Akihiro Tanaka, Tokyo (JP); Chaitanya Prasad Narisetty, Tokyo (JP)

(73) Assignee: NEC CORPORATION, Tokyo (JP)

( * ) Notice: Subject to any disclaimer, the term of this patent is extended or adjusted under 35 U.S.C. 154(b) by 347 days.

(21) Appl. No.: 17/602,358

(22) PCT Filed: Apr. 16, 2019

(86) PCT No.: PCT/JP2019/016335
§ 371 (c)(1),
(2) Date: Oct. 8, 2021

(87) PCT Pub. No.: WO2020/213060
PCT Pub. Date: Oct. 22, 2020

(65) Prior Publication Data
US 2022/0170766 A1    Jun. 2, 2022

(51) Int. Cl.
*G01D 5/353*     (2006.01)
*G01H 9/00*     (2006.01)

(52) U.S. Cl.
CPC ......... *G01D 5/35358* (2013.01); *G01H 9/004* (2013.01)

(58) Field of Classification Search
CPC .. G01H 9/004; G08G 1/0116; G01D 5/35358; G01D 5/35361; G01D 5/35364
See application file for complete search history.

(56) References Cited

U.S. PATENT DOCUMENTS 10,198,946 B2 *   2/2019  Crickmore ............... G08G 1/04
10,431,077 B2 *  10/2019  Martin ..................... G08G 1/07
10,928,546 B2 *   2/2021  Lewis ....................... B61L 1/20
(Continued)

FOREIGN PATENT DOCUMENTS

JP    H11-326124 A    11/1999
JP    2002-048675 A    2/2002
JP    2002-206971 A    7/2002
(Continued)

OTHER PUBLICATIONS

International Search Report for PCT Application No. PCT/JP2019/016335, dated May 28, 2019.
(Continued)

*Primary Examiner* — Justin N Olamit (57) ABSTRACT

According to one example embodiment, an optical fiber sensor includes an optical fiber cable and a device body configured to cause an optical pulse signal to be incident on the optical fiber cable and identify, from intensity change of backscattered light of the incident optical pulse signal and an arrival time of the backscattered light, a prescribed environmental change having occurred in a vicinity of the optical fiber cable and an occurrence location of the environmental change, in which the device body performs correction of a sensing location on the optical fiber cable, based on environmental change information including the identified occurrence location and installation location information of the optical fiber cable.

3 Claims, 7 Drawing Sheets

(56) References Cited

U.S. PATENT DOCUMENTS 11,132,542 B2 * 9/2021 Ji .............................. G01D 3/02
11,763,648 B2 * 9/2023 Kojima ................ G08B 13/124
                                                               340/555

FOREIGN PATENT DOCUMENTS

| | | | |
|---|---|---|---|
| JP | 2003-057124 | A | 2/2003 |
| JP | 2003-247814 | A | 9/2003 |
| JP | 3935631 | B2 * | 6/2007 |
| JP | 2007-174597 | A | 7/2007 |
| JP | 2007174597 | A * | 7/2007 |
| JP | 2018-044799 | A | 3/2018 |
| JP | 6406418 | B1 | 10/2018 |
| JP | 2019-060665 | A | 4/2019 |
| WO | 2016/021689 | A1 | 2/2016 |
| WO | 2017/072505 | A1 | 5/2017 |
| WO | 2019/022084 | A1 | 1/2019 |

OTHER PUBLICATIONS

Japanese Office Action for JP Application No. 2021-514688 dated Jun. 14, 2022 with English Translation.

* cited by examiner

OPTICAL FIBER SENSOR, AND MONITORING SYSTEM

This application is a National Stage Entry of PCT/JP2019/016335 filed on Apr. 16, 2019, the contents of all of which are incorporated herein by reference, in their entirety.

TECHNICAL FIELD

The present invention relates to an optical fiber sensor, a monitoring system, a sensing location correction method, and a non-transitory computer-readable medium.

BACKGROUND ART

Optical fiber sensors are widely in practical use for the purpose of, for example, maintenance of an optical fiber for communication or abnormality diagnosis of an infrastructure.

For the purpose of maintenance of an optical fiber for communication, an optical time domain reflectometry (OTDR) method has been employed. The OTDR is a method of transmitting optical pulses from a transmission end of a measurement device and measuring intensity change of backscattered light that returns in the opposite direction to the direction of the optical pulses transmitted in an optical fiber. The optical intensity of backscattered light changes at a connection point of optical fibers like an optical connector, a disconnection point, and an abnormal loss point. Such points can be identified by calculation based on propagation time from an optical pulse is transmitted until backscattered light is measured.

For the purpose of abnormality diagnosis of an infrastructure, a brillouin optical time domain reflectometry (BOTDR) method has been employed. The BOTDR, although, as with the afore-described OTDR, transmitting optical pulses from a transmission end, measures a different type of backscattered light. The BOTDR measures backscattered light referred to as Brillouin scattered light. Since the Brillouin scattered light has characteristics that, when a strain or the like is applied to an optical fiber, a frequency shift occurs, measuring the frequency shift enables whether or not a strain is applied to the fiber to be determined.

Although, as described above, optical fiber sensors are widely applied for the purpose of abnormality detection at a connection point of optical fibers and measurement of strain, types of environmental information that optical fiber sensors can detect have increased recent years due to narrowing of line width of the laser spectrum and innovation in devices for optical network, such as a coherent (property in which waves interfere with one another) reception method. Since it has newly become possible to detect state change in phase of light, targets to be measured are expanded to not only the amount of reflection, strain, and temperature, which have hitherto been measured, but also other elements, such as vibration and sound. Because of this development, the application area of optical fiber sensors is expected to be expanded to location information recognition of a mobile object, such as continuous detection of traveling vibration generated by a vehicle or a train, using an optical fiber cable installed along an expressway or a railroad track for trains for the purpose of data communication.

CITATION LIST

Patent Literature

Patent Literature 1: International Patent Publication No. WO 2017/072505
Patent Literature 2: International Patent Publication No. WO 2016/021689
Patent Literature 3: Japanese Unexamined Patent Application Publication No. 2007-174597
Patent Literature 4: Japanese Unexamined Patent Application Publication No. 2003-247814
Patent Literature 5: Japanese Unexamined Patent Application Publication No. 2002-048675
Patent Literature 6: Japanese Unexamined Patent Application Publication No. H11-326124

SUMMARY OF INVENTION

Technical Problem

The following analysis is given by the inventors of this application. Regarding optical fiber cables for data communication that have already been installed along expressways or railroad tracks, the optical fiber cables are installed on structures in various installation states, and, depending on the installation state, a difference occurs between a sensing location on the optical fiber cable and an actual sensing location. Examples of the installation state include deflection, extra length, and the like of an optical fiber cable. For example, even when a location at 10 km on an optical fiber cable is sensed, sensing data at a location at 9 km, which is shorter than the distance to the sensed location, are actually obtained because of deflection and extra length. The difference between the locations is at most 10%, and the longer the distance is, the larger the difference between sensing locations becomes.

In consideration of the above-described problem, an object of the present disclosure is to provide an optical fiber sensor, a monitoring system, a sensing location correction method, and a non-transitory recording medium that are capable of compensating for a difference between a sensing location on a fiber cable and an actual sensing location that occurs depending on an installation state of an optical fiber cable.

Solution to Problem

An optical fiber sensor according to one example embodiment includes an optical fiber cable and a device body configured to cause an optical pulse signal to be incident on the optical fiber cable and identify, from intensity change of backscattered light of the incident optical pulse signal and an arrival time of the backscattered light, a prescribed environmental change having occurred in a vicinity of the optical fiber cable and an occurrence location of the environmental change, in which the device body performs correction of a sensing location on the optical fiber cable, based on environmental change information including the identified occurrence location and installation location information of the optical fiber cable.

A monitoring system according to the one example embodiment includes the optical fiber sensor described above and a monitoring camera or a point vibration sensor configured to sense a point-like location.

A sensing location correction method according to the one example embodiment includes the steps of causing an optical pulse signal to be incident on an optical fiber cable, identifying, from intensity change of backscattered light of an incident optical pulse signal and an arrival time of the backscattered light, a prescribed environmental change having occurred in a vicinity of the optical fiber cable and an occurrence location of the environmental change, and performing correction of a sensing location on the optical fiber cable, based on environmental change information including the identified occurrence location and installation location information of the optical fiber cable.

A sensing location correction program according to the one example embodiment causes a computer to execute causing an optical pulse signal to be incident on an optical fiber cable, identifying, from intensity change of backscattered light of an incident optical pulse signal and an arrival time of the backscattered light, a prescribed environmental change having occurred in a vicinity of the optical fiber cable and an occurrence location of the environmental change, and performing correction of a sensing location on the optical fiber cable, based on environmental change information including the identified occurrence location and installation location information of the optical fiber cable.

Advantageous Effects of Invention

The one example embodiment enables an optical fiber sensor, a monitoring system, a sensing location correction method, and a non-transitory recording medium that are capable of compensating for a difference between a sensing location on a fiber cable and an actual sensing location that occurs depending on an installation state of an optical fiber cable to be provided.

DESCRIPTION OF EMBODIMENT

Example embodiments will be described below with reference to the drawings. Note that, when drawing reference numerals are assigned herein, the reference numerals are solely for facilitating understanding and are not intended to limit the example embodiments to illustrated modes. The example embodiments described below are just exemplifications and do not limit the present invention. Further, connection lines between blocks in the drawings that will be referred to in the description below include both a bidirectional line and a unidirectional line.

First Example Embodiment

Figure 1:
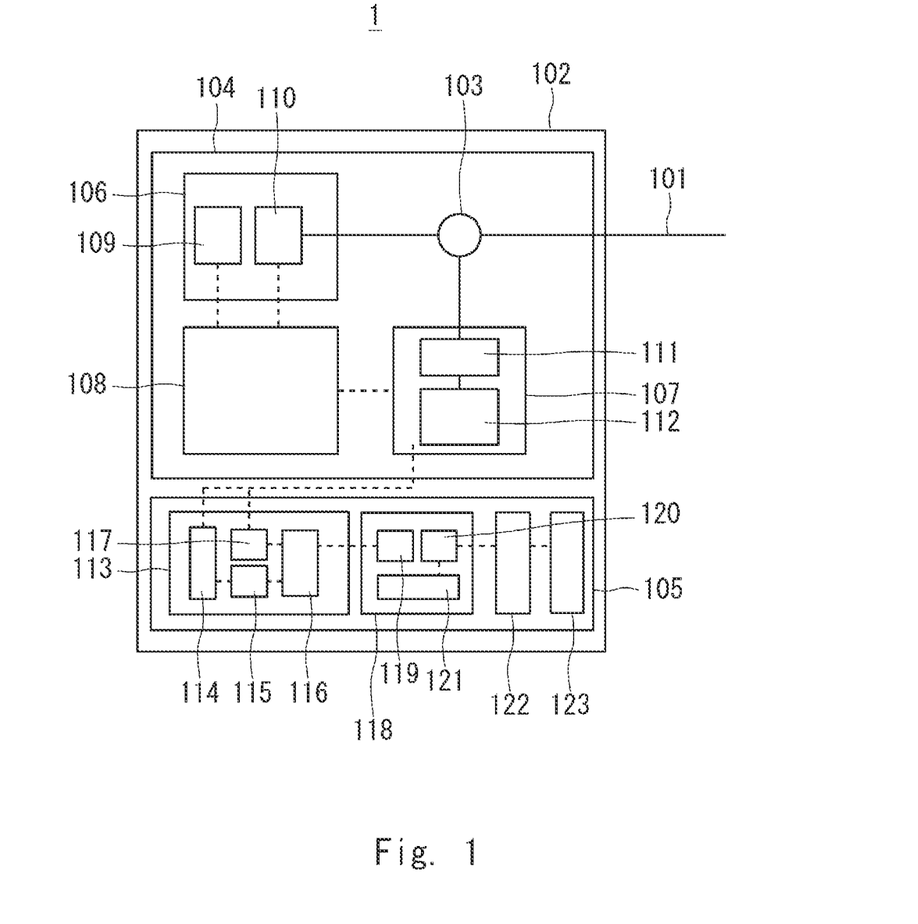
FIG. 1 is a block diagram schematically illustrating a configuration of an optical fiber sensor according to a first example embodiment.

An optical fiber sensor according to a first example embodiment will be described using the drawings. FIG. 1 is a block diagram schematically illustrating a configuration of the optical fiber sensor according to the first example embodiment.

As illustrated in FIG. 1, an optical fiber sensor 1 is a sensor device configured to detect environmental change in the amount of reflection, strain, temperature, vibration, sound, or the like, using an optical fiber cable 101 that serves as a medium for sensing. The optical fiber sensor 1 includes the optical fiber cable 101 and a device body 102.

The optical fiber cable 101 is a linear cable through which an optical pulse signal can be propagated and may be an optical fiber cable 101 that is generally in widespread use for data communication. The optical fiber cable 101 has one end connected to an optical circulator 103 of the device body 102 and the other end having been subjected to reflection-free termination treatment in order to suppress reflection of an optical signal.

The optical fiber cable 101 can be connected to or arranged in a vicinity of an object (detection target) for which a prescribed environmental change in the amount of reflection, strain, temperature, vibration, or the like is to be detected. For example, the optical fiber cable 101 may be connected to an optical fiber cable 101 for communication for which abnormal loss at a connection point is to be detected or can be arranged in contact with the outer side of equipment or the like for which abnormality is to be detected. In a use related to the first example embodiment, vibration of a vehicle traveling on an expressway is detected, using an optical fiber cable 101 for communication that is installed along the expressway.

The device body 102 is a main body of the optical fiber sensor 1. The device body 102 includes a sensor unit 104 configured to, by transmitting and receiving an optical pulse signal, perform sensing of movement of a mobile object in a continuous manner and an analysis unit 105 configured to analyze data acquired by the sensor unit 104. The sensor unit 104 includes a transmission unit 106 configured to generate an optical pulse signal, a reception unit 107 configured to receive an optical pulse signal, and a control unit 108 configured to control the transmission unit 106 and the reception unit 107. The transmission unit 106 includes a light emitting element 109 and a drive circuit thereof and an optical modulator 110. For the light emitting element 109, a laser diode (LD) that has narrow line width with high coherence is used. The drive circuit is a circuit configured to drive the light emitting element 109 and drives the light emitting element 109 in such a way that optical pulses having a uniform period (pulse width) are emitted from the light emitting element 109, controlled by the control unit 108. The optical modulator 110 is a device configured to modulate optical pulses output from the light emitting element 109. The light emitting element 109, the drive circuit, and the optical modulator 110 are capable of changing wavelength, frequency, intensity, phase, and the like of light, controlled by the control unit 108. Optical pulses modulated by the optical modulator 110 are output to the optical fiber cable 101 via the optical circulator 103.

The optical circulator 103 is a component configured to cause optical pulses output from the optical modulator 110 to be incident on the optical fiber cable 101 and output backscattered light of the optical pulses having returned from the optical fiber cable 101 to an optical detector 111 of the reception unit 107.

The reception unit 107 is a functional unit configured to receive backscattered light. The reception unit 107 includes the optical detector 111 and a digital processing circuit 112. The optical detector 111 is a device configured to convert received backscattered light to analog data. For the optical detector 111, for example, a photo detector (PD) can be used. Analog data (analog data relating to backscattered light) output from the optical detector 111 are output to the digital processing circuit 112. The digital processing circuit 112 is a functional unit configured to convert analog data (analog data relating to backscattered light) output from the optical detector 111 to digital data (digital data relating to backscattered light). For the digital processing circuit 112, for example, a semiconductor integrated circuit device can be used. Digital data converted by the digital processing circuit 112 are output to the analysis unit 105.

The control unit 108 is a functional unit configured to control the transmission unit 106, which generates a pulse signal, and the reception unit 107, which receives a pulse signal. The control unit 108, by controlling the optical modulator 110, controls an optical signal from the light emitting element 109 in such a way that optical pulses are emitted from the light emitting element 109 in a constant period (pulse width). In addition, the control unit 108 performs control in such a way that the transmission unit 106 is synchronized with the reception unit 107. The control unit 108 performs control in such a way that a sampling period becomes shorter than the pulse width. The control unit 108 synchronizes transmission timing of optical pulses output from the transmission unit 106 with detection timing of backscattered light detected by the reception unit 107.

The analysis unit 105 is a functional unit configured to analyze data acquired by the sensor unit 104. The analysis unit 105 includes a vibration detection unit 113 configured to determine vibration, based on change in the state of a received signal, a location correction processing unit 118 configured to estimate a boundary location at which vibration characteristics change, and a normalization processing unit 122 configured to suppress variation in output signal intensity that depends on a location.

The vibration detection unit 113 includes a parallel processing unit 114, an integration unit 115, a variation amount calculation unit 116, and an occurrence area estimation unit 117. The parallel processing unit 114 is a functional unit configured to sample digital data relating to backscattered light of optical pulses, which are output from the digital processing circuit 112, at a specific frequency and perform parallel processing for each sampling time. The period of the parallel processing corresponds to a round trip time of an optical pulse to a farthest measurement point of the optical fiber cable 101. In other words, a time from an optical pulse is output from the transmission unit 106 until, after the optical pulse has reached the farthest measurement point on the optical fiber cable 101, backscattered light returns from the measurement point to the reception unit 107 is a minimum period of the parallel processing. Thus, data of backscattered light that returns from the same location on the optical fiber cable 101 are constantly processed in the same processing plane. The digital data (digital data relating to backscattered light) for each sampling time that have been subjected to parallel processing by the parallel processing unit 114 are output to the integration unit 115.

The integration unit 115 is a functional unit configured to calculate integration data for each sampling time by integrating digital data relating to backscattered light, which have been subjected to parallel processing by the parallel processing unit 114, during a preset period. The integration data (integration data relating to backscattered light) for each specific sampling time that have been integrated by the integration unit 115 are output to the variation amount calculation unit 116.

The variation amount calculation unit 116 is a functional unit configured to calculate the amount of variation (the amount of variation relating to backscattered light) in the integration data that have been integrated by the integration unit 115, for each sampling time. The amount of variation serves as amplitude of vibration.

The occurrence area estimation unit 117 is a functional unit configured to estimate an occurrence area of an environmental change. The occurrence area estimation unit 117 estimates an occurrence area of an environmental change in the longitudinal direction of the optical fiber cable 101, based on a sampling time at which measurement of the environmental change started and a sampling time at which the measurement of the environmental change ended. The amount of variation for each sampling time, which has been calculated by the variation amount calculation unit 116, is output to the location correction processing unit 118 as a vibration value for each location in conjunction with information from the occurrence area estimation unit 117.

As described above, the vibration detection unit 113 detects vibration of the optical fiber cable 101 from chronological change of intensity change of backscattered light and, at the same time, detects an occurrence location of an environmental change from the amounts of variation in the vibration amplitude. Thus, the device body 102 causes an optical pulse signal to be incident on the optical fiber cable 101 and identifies, from intensity change of backscattered light of the incident optical pulse signal and an arrival time of the backscattered light, a prescribed environmental change that has occurred in the vicinity of the optical fiber cable 101 and an occurrence location of the environmental change.

The location correction processing unit 118 includes a boundary location estimation unit 119, a location correction unit 120, and an actual location information unit 121. The boundary location estimation unit 119 is a functional unit configured to estimate a boundary location at which vibration characteristics change. Vibration amount information for each location along the optical fiber cable 101 from the vibration detection unit 113 has a different feature in vibration characteristics with respect to each location at which the optical fiber cable 101 is installed. For example, in vibration amount information obtained from the optical fiber cable 101 that is installed on a bridge section, since the whole bridge vibrates due to traveling vibration of a vehicle, wind, and the like, a difference in vibration intensity between the traveling vibration of the vehicle and the vibration of the bridge becomes small. In other words, when the vibration of the whole bridge is considered as a noise, a signal-to-noise ratio is reduced on the bridge section. The boundary location estimation unit 119 is a functional unit configured to estimate a boundary location at which the vibration characteristics change. Examples of an estimation criterion include a case where, using a ratio (S/N ratio) of the intensity of traveling vibration of a vehicle to the intensity of vibration of the bridge section, which is equivalent to background noise, as a reference, a location at which the S/N ratio changes is estimated as a boundary location.

The actual location information unit 121 has location information (location marker) of a bridge section or a tunnel section in advance. The location correction unit 120 is a functional unit configured to estimate a location correction amount by comparing the location information and a boundary location estimated by the boundary location estimation unit 119 with each other. In the case of the afore-described bridge section, the location correction unit 120 compares distance information of an area in which the S/N ratio calculated by the boundary location estimation unit 119 is low with the location information of the bridge section that the actual location information unit 121 has and thereby estimates a correction amount.

For example, it is assumed that, from sensing information acquired using the optical fiber sensor 1, an area in which the S/N ratio deteriorates is detected in a 10 km section from the 10 km point to the 20 km point. It is also assumed that, on the other hand, actual location information of the bridge section that the location correction unit 120 has indicates a 9 km section from the 10.5 km point to the 19.5 km point. In this case, the location correction unit 120 corrects the section information that was acquired using the sensor and where the S/N ratio deteriorates from the section from the 10 km point to the 20 km point to the section from the 10.5 km point to the 19.5 km point, and outputs the location information of the 10 km section that was acquired using the sensor as information of a 9 km section, which is nine tenth of the 10 km section. This new location information after correction and the vibration intensity information are output to the normalization processing unit 122.

As described above, the location correction processing unit 118 has installation location information of the optical fiber cable 101 and performs correction of a sensing location on the optical fiber cable 101, based on environmental change information including an occurrence location of an environmental change that the vibration detection unit 113 detected and the installation location information of the optical fiber cable 101.

The normalization processing unit 122 is a functional unit configured to perform normalization by dividing the amounts of variation by a maximum value among the amounts of variation, during a preset period for each sampling time. The normalized data are output to an output unit 123.

The output unit 123 is a functional unit configured to output information and outputs information (display, sound output, printing, signal output, or the like).

Next, a detection principle of the optical fiber sensor 1 according to the first example embodiment will be described. An optical pulse signal is caused to be incident on the optical fiber cable 101. When an optical signal is propagated through the optical fiber cable 101, slight backscattered light propagates in the opposite direction to the travel direction of the optical signal from all the locations in the longitudinal direction of the optical fiber cable 101. Although there are various types of backscattered light, Rayleigh scattered light is measured as backscattered light in the first example embodiment. Rayleigh scattered light becomes scattered light having the same frequency components as those of a transmitted optical signal. When an environmental change in vibration, sound, or the like occurs on the optical fiber cable 101 and the environmental change is conveyed to the optical fiber cable 101, the state of backscattered light that returns from a location at which the environmental change has occurred changes. Specifically, intensity and a phase of backscattered light change. Catching change in the intensity and phase enables an occurrence of environmental change to be detected. As for identification of a location at which a change in the intensity and phase has occurred, using an optical pulse signal with a finite duration as an optical signal enables at what location of the optical fiber cable the environmental change has occurred to be calculated based on a time during which an optical pulse was transmitted from the transmission unit 106 (a period or pulse width can also be used) and a time during which backscattered light in which a change in the intensity and the phase occurred was measured (a time from the measurement start to the measurement end).

Figure 2:
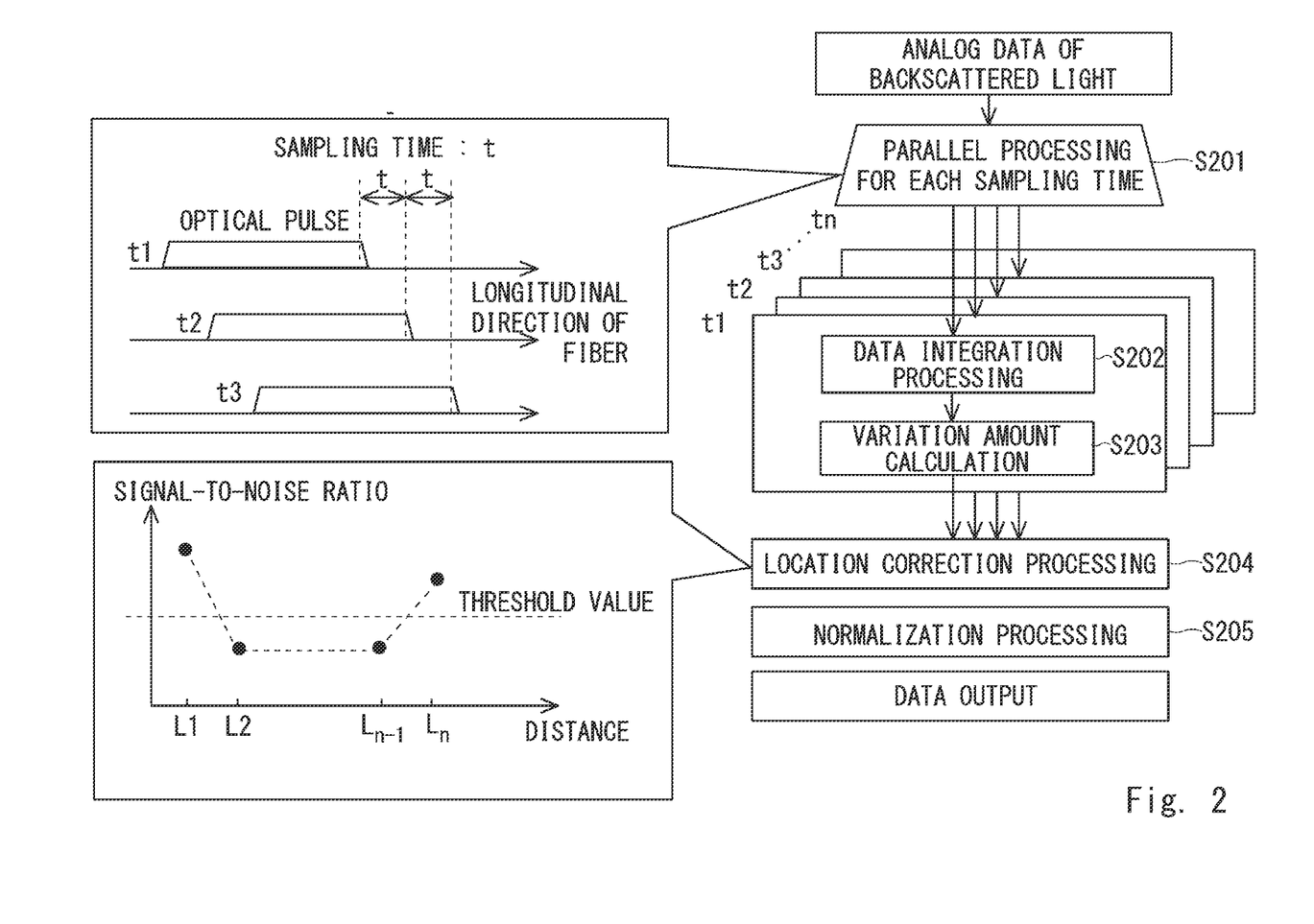
FIG. 2 is a sequence schematically illustrating operation of an analysis unit in the optical fiber sensor according to the first example embodiment.

Next, operation of the analysis unit 105 in the optical fiber sensor 1 according to the first example embodiment will be described using the drawings. FIG. 2 is a sequence schematically illustrating the operation of the analysis unit 105 in the optical fiber sensor 1 according to the first example embodiment. As for the constituent components of the optical fiber sensor 1, see FIG. 1.

When backscattered light from the optical fiber cable 101 is received by the reception unit 107 via the optical circulator 103, the optical detector 111 in the reception unit 107 converts the backscattered light to analog data and outputs the converted analog data (analog data relating to backscattered light) to the digital processing circuit 112.

The digital processing circuit 112 samples the analog data (analog data relating to backscattered light) at a specific frequency and generates digital data (digital data relating to backscattered light) for each sampling time ($t1, t2, t3, \ldots, tn-1, tn$). After having converted the analog data to digital data (digital data relating to backscattered light), the digital processing circuit 112 outputs the converted digital data to the parallel processing unit 114 of the vibration detection unit 113 included in the analysis unit 105. When the converted digital data are input to the parallel processing unit 114, the parallel processing unit 114 performs parallel processing on the digital data (digital data relating to backscattered light) for each sampling time ($t1, t2, t3, \ldots, tn-1, tn$) and outputs the digital data for each sampling time that have been subjected to the parallel processing to the integration unit 115 (step 201).

In this processing, the period of the parallel processing corresponds to a round trip time of an optical pulse to a farthest measurement point of the optical fiber cable 101. In other words, a time from an optical pulse is output from the transmission unit 106 until, after the optical pulse has reaches the farthest measurement point (a point at a distance reachable at the sampling time $tn$) on the optical fiber cable 101, backscattered light of the optical pulse returns from the measurement point to the reception unit 107 is a period of the parallel processing. Thus, data of backscattered light of optical pulses that returns from the same location are constantly processed in the same processing plane.

When the digital data for each sampling time that have been subjected to the parallel processing are input to the integration unit 115, the integration unit 115 integrates the digital data (digital data relating to backscattered light) during a preset period for each sampling time and outputs the integrated integration data (integration data relating to backscattered light) for each sampling time to the variation amount calculation unit 116 (step 202).

When the integrated integration data for each sampling time are input to the variation amount calculation unit 116, the variation amount calculation unit 116 of the vibration detection unit 113 calculates the amount of variation during the preset period from the integration data (integration data relating to backscattered light) for each sampling time and outputs the calculated amount of variation (the amount of variation relating to backscattered light) for each sampling time to the occurrence area estimation unit 117 (step 203).

Association of sampling times and occurrence locations is performed by the occurrence area estimation unit 117. The occurrence area estimation unit 117 estimates an occurrence area of an environmental change in the longitudinal direction of the optical fiber cable 101 from a sampling time at which measurement of an environmental change started and a sampling time at which the measurement of the environmental change ended and outputs information relating to the estimated occurrence area of the environmental change to the location correction processing unit 118. Since the respective sampling times of the measurement start and measurement end of an environmental change and the distance in the longitudinal direction of the optical fiber cable are convertible to each other, it is possible to identify an occurrence area of an environmental change. In this way, from change in the intensity of backscattered light of an incident optical pulse signal and an arrival time of the backscattered light, a prescribed environmental change that has occurred in a vicinity of the optical fiber cable 101 and an occurrence location of the environmental change are identified.

When information of the calculated amounts of variation (the amounts of variation relating to backscattered light) with respect to the distance in the longitudinal direction of the optical fiber is input to the location correction processing unit 118, a signal-to-noise ratio is calculated during a preset period for each distance. The signal-to-noise ratio is a ratio of the amount of variation in traveling vibration of a vehicle to the amount of variation in a background level. When the ratio exceeds a preset setting value, a corresponding location is estimated to be a boundary location. The boundary location information is input to the location correction unit 120, and, in the location correction unit 120, a correction amount is estimated through matching with actual location information and correction processing is performed (step 204). That is, correction of a sensing location on the optical fiber cable 101 is performed, based on environmental change information including an identified occurrence location and the installation location information of the optical fiber cable 101.

Processing of the location correction processing unit 118 will be described using an example of digital data in FIGS. 3 and 4.

Figure 3:
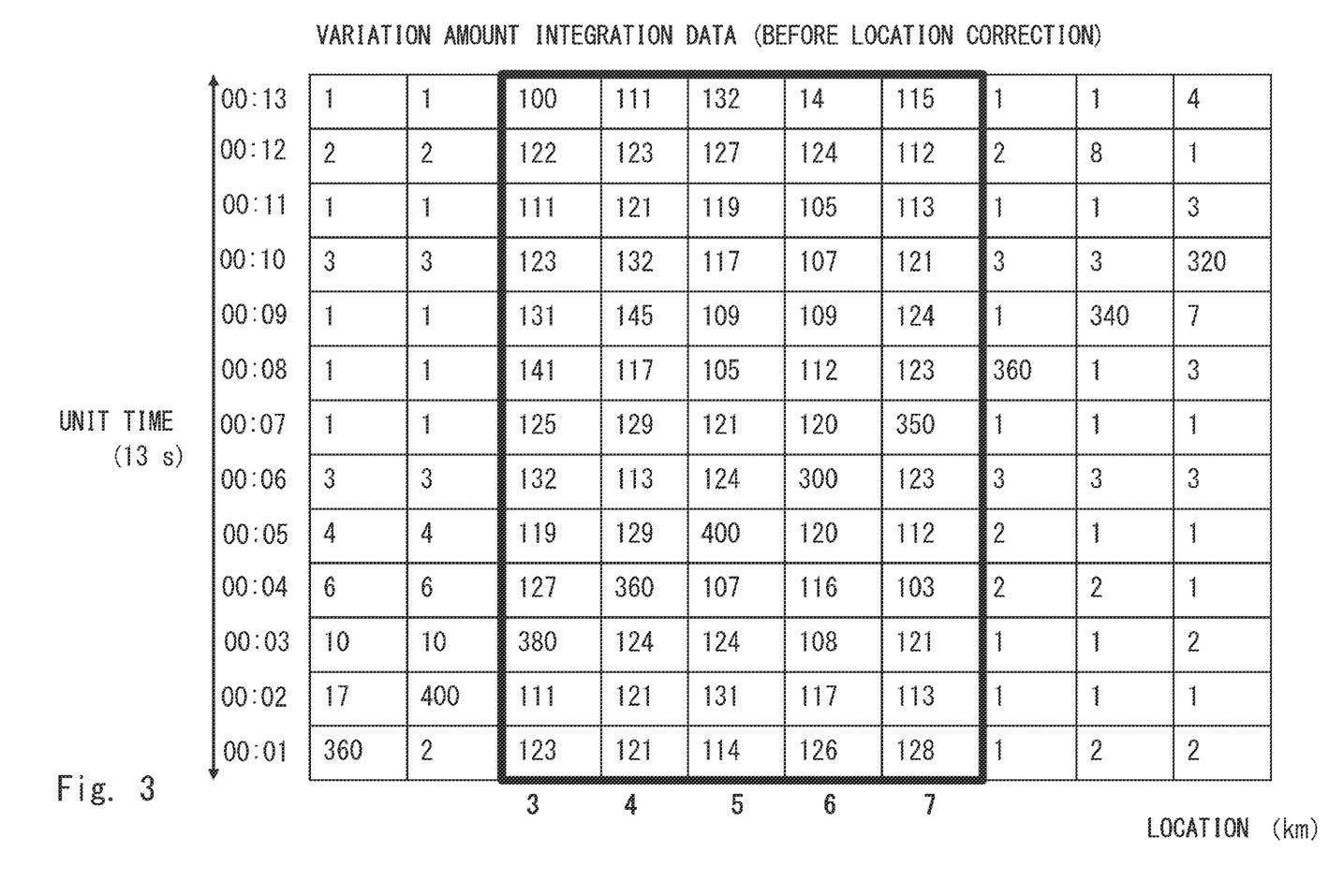
FIG. 3 is a diagram schematically illustrating digital data before location correction processing in the optical fiber sensor according to the first example embodiment.
Figure 4:
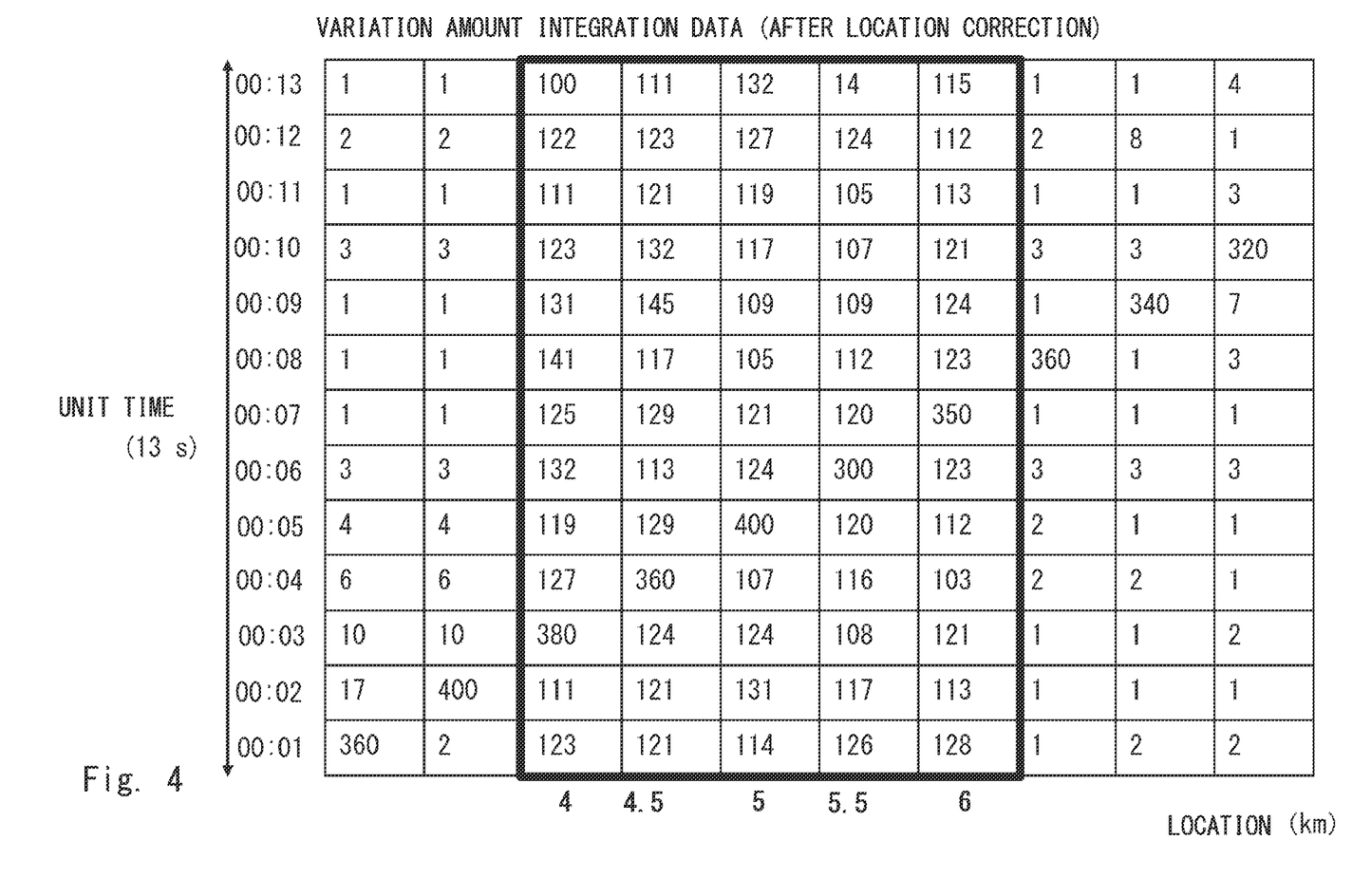
FIG. 4 is a diagram schematically illustrating digital data after location correction processing in the optical fiber sensor according to the first example embodiment.

FIG. 3 is a diagram schematically illustrating digital data before location correction processing in the optical fiber sensor according to the first example embodiment. FIG. 4 is a diagram schematically illustrating digital data after location correction processing in the optical fiber sensor according to the first example embodiment. Both FIGS. 3 and 4 simulate a result of detection of vibration occurring when a mobile object moves along the optical fiber cable 101. Digital data representing the magnitude of the amount of variation of backscattered light are exhibited on a chart the abscissa of which represents the sampling period and the ordinate of which represents the unit time. The sampling period of the abscissa is equivalent to distance because a speed at which a pulse propagates is self-evident. A larger value of the amount of variation of backscattered light means a larger intensity of vibration.

In other words, in FIG. 3, vibration is observed as background noise at locations on the optical fiber cable 101 in a section from a distance of 3 km to a distance of 7 km. It is assumed that, on the other hand, location information of structures indicates that a section from the 4 km point to the 6 km point is a bridge section. In this case, as location correction, a location correction correcting the location at 3 km and the location at 7 km, which are acquired in the sensing, to the location at 4 km and the location at 6 km, respectively, is performed. In other words, in the digital data after location correction processing, a section in which background noise is observed is a section from the 4 km point to the 6 km point. Distance resolution is proportionally divided based on distance differences before and after location correction processing. This location correction processing enables a difference between a sensing location on the optical fiber cable 101 and an actual sensing location to be reduced. Performing the location correction processing with respect to all structures the vibration characteristics of which change causes the number of correction sites to increase, which enables effect of the location correction processing to be increased.

When information of the corrected amounts of variation (the amounts of variation relating to backscattered light) with respect to the distance in the longitudinal direction of the optical fiber cable 101 is input to the normalization processing unit 122, the normalization processing unit 122 calculates a maximum value of the amounts of variation during a constant time range for each sampling time. The normalization processing unit 122 performs normalization by dividing the values of the amount of variation by the calculated maximum value (step 205).

As described above, the optical fiber sensor 1 performs correction of a sensing location on the optical fiber cable 101, based on the environmental change information including an occurrence location of an environmental change and the installation location information of the optical fiber cable 101.

The correction of a sensing location uses a location of change in vibration characteristics that is derived from intensity change of backscattered light caused by a structure, such as a bridge section and a tunnel, disposed on a road or a railroad track, as environmental change information. The correction of a sensing location also uses the location of a structure, such as a bridge section and a tunnel, disposed on a road or a railroad track, as installation location information of the optical fiber cable 101. By comparing the environmental change information and the installation location information with each other, the optical fiber sensor 1 is capable of compensating for a difference between a sensing location on the optical fiber cable 101 and an actual sensing location.

Note that the installation location information is not limited to information relating to a structure, such as a bridge section and a tunnel, disposed on a road or a railroad track. For example, the correction of a sensing location may use a location of change in vibration characteristics that is derived from intensity change of backscattered light caused by at least any one of a pavement state of a road, a joint of a road, and a joint of a railroad track, on which a mobile object, such as a vehicle and a train, travels, as environmental change information. A pavement state of a road, a joint of a road, and a joint of a railroad track may be used as installation location information.

Change in vibration characteristics caused by such conditions is determined, using a prescribed value of a ratio of signal intensity to noise intensity with respect to traveling vibration generated by a mobile object as a threshold value. That is, when a ratio of the signal intensity of traveling vibration to the noise intensity of traveling vibration exceeds a threshold value, it is determined that the vibration characteristics has changed. Change in vibration characteristics may be determined, using a prescribed value of the signal intensity of traveling vibration generated by a mobile object traveling on a road or a railroad track as a threshold value or may be determined, using a prescribed value of the noise intensity of the traveling vibration generated by the mobile object as a threshold value.

Figure 5:
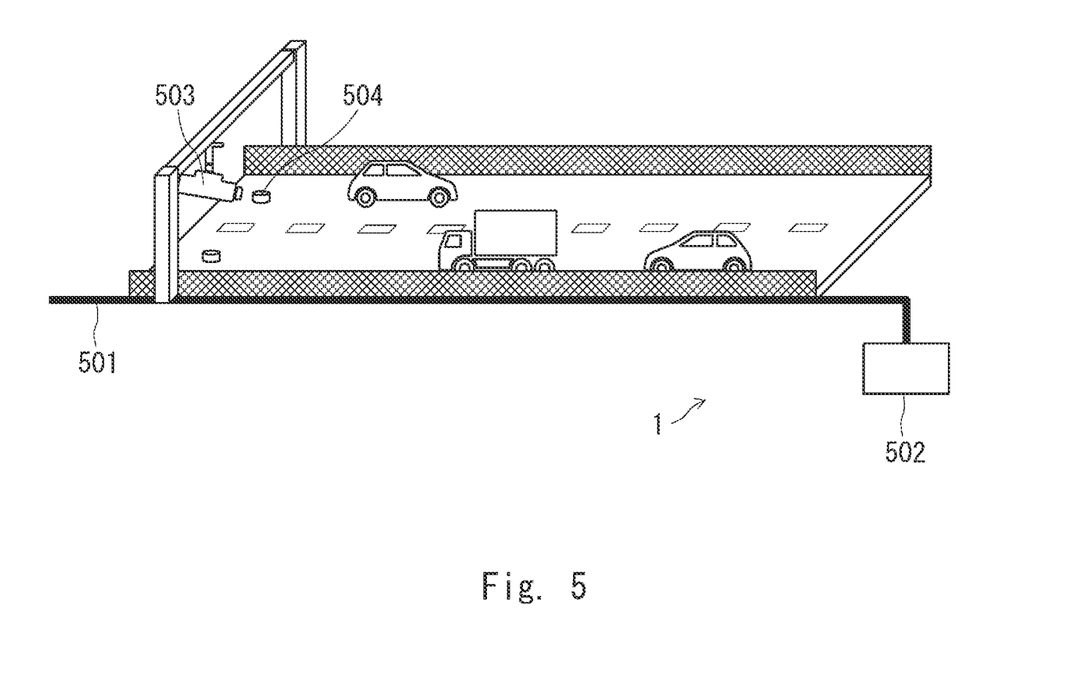
FIG. 5 is a schematic diagram illustrating an application example of the optical fiber sensor according to the first example embodiment.

Next, an application example of the optical fiber cable of the optical fiber sensor according to the first example embodiment will be described, using the drawings. FIG. 5 is a schematic diagram illustrating an application example of the optical fiber sensor according to the first example embodiment.

An optical fiber cable 501 is, for example, an optical fiber cable 501 that is installed along an expressway. The optical fiber cable 501 may be newly installed for the purpose of sensing, or an existing optical fiber cable 501 for information communication may be used as the optical fiber cable 501.

Using an optical fiber sensor 1 including the optical fiber cable 501 and a device body 502, monitoring cameras 503, and point vibration sensors 504 configured to perform sensing at point-like locations on a point-by-point basis, in combination with one another as a monitoring system enables environmental change in vibration, sound, or the like generated by travel of a vehicle to be detected. In particular, since an expressway is a long-distance road, it is difficult to constantly monitor all locations on the expressway in a continuous manner, using the monitoring cameras 503 and the vibration sensors 504. Hence, the optical fiber sensor 1 can be used for a complimentary purpose to such a monitoring system. In other words, combining information from the optical fiber sensor 1 that detects vibration or sound with respect to movement of a vehicle on the expressway and information from an existing monitoring system of the expressway including the monitoring cameras 503 and the point vibration sensors 504 of the point sensing type enables continuous monitoring of movement of vehicles on the expressway. This configuration enables the optical fiber sensor 1 and the monitoring system to be used as a traffic monitor for detecting congestion occurrence and detecting wrong-way driving.

Acquired data can be used not only for monitoring of a mobile object but also for various uses. For example, vibration data of a bridge pier portion can be used for recognizing a deterioration state, based on change in the state of vibration of the bridge pier.

According to the first example embodiment, change in vibration characteristics used for the location correction processing may be not only change in vibration characteristics caused by a bridge section along a road but also change in vibration characteristics caused by a tunnel section, a road surface connecting portion, or a road pavement.

In addition, according to the first example embodiment, the correction of a sensing location may be correction that uses a change point in a traveling vibration trajectory of a mobile object, which is dependent on a cable installation environment including a housing unit for extra length of the optical fiber cable 101 or 501, and that performs determination, using a slope of traveling distance with respect to time as a threshold value. That is, the correction of a sensing location may use a location of change in vibration characteristics that is derived from intensity change of backscattered light caused by the installation state of the optical fiber cable 101 including the housing unit for extra length of the optical fiber cable 101, as environmental change information. Locations of change in vibration characteristics include a change point of a trajectory in traveling vibration that a mobile object generates. A change point is determined using a prescribed value of the slope of travel distance with respect to time as a threshold value.

According to the first example embodiment, the location correction processing does not have to be performed every day and may be performed immediately after installation of the optical fiber cable 101 or 501 or may be performed periodically in maintenance operation or the like. In addition, when a condition of weather is different from a prescribed condition, it is desirable to perform the normalization processing depending on the condition of weather.

Second Example Embodiment

An application example of an optical fiber sensor according to a second example embodiment will be described. The optical fiber sensor according to the second example embodiment uses an optical fiber cable installed along a railroad track for trains. The optical fiber cable may be newly installed for the purpose of sensing, or an existing optical fiber cable for data communication may be used. The optical fiber cable and the optical fiber sensor including a device body are used in combination with a train operation monitoring system including monitoring cameras, a track circuit, and radio-based train location sensors. The optical fiber sensor is capable of detecting environmental change in vibration, sound, or the like generated by travel of a train. Since the distance of a railroad track is long and there are some locations, such as a location in a tunnel in a mountainous area, that radio waves do not reach depending on an environment around the location, it is difficult to constantly monitor the whole distance, using the monitoring cameras and the radio-based sensors. The optical fiber sensor can be used for a complimentary purpose to the monitoring system. In other words, combining information from the optical fiber sensor having detected vibration or sound and information from the train operation monitoring system with respect to movement of a train enables continuous monitoring of movement of a train with higher precision. Through use of the method proposed herein, it is possible to provide the location information of a train accurately by performing location correction, based on change in vibration characteristics occurring on a bridge section or in a tunnel section, which are located along a railroad track. Acquired data are used not only for monitoring of a train but also for various uses. For example, vibration data of an overpass portion are used for recognizing a deterioration state, based on change in the state of vibration of the overpass.

According to the second example embodiment, change in vibration characteristics used for the location correction processing may be change in vibration characteristics caused by a bridge section, a tunnel section, or a track connecting portion along a railroad track.

In addition, according to the second example embodiment, the correction of a sensing location may be correction that uses a change point in a traveling vibration trajectory of a mobile object, which is dependent on a cable installation environment including a housing unit for extra length of the optical fiber cable, and that performs determination, using a slope of traveling distance with respect to time as a threshold value.

According to the second example embodiment, the location correction processing does not have to be performed every day and may be performed immediately after installation of the optical fiber cable or may be performed periodically in maintenance operation or the like. In addition, when a condition of weather is different from a prescribed condition, it is desirable to perform the normalization processing depending on the condition of weather.

Third Example Embodiment

Figure 6:
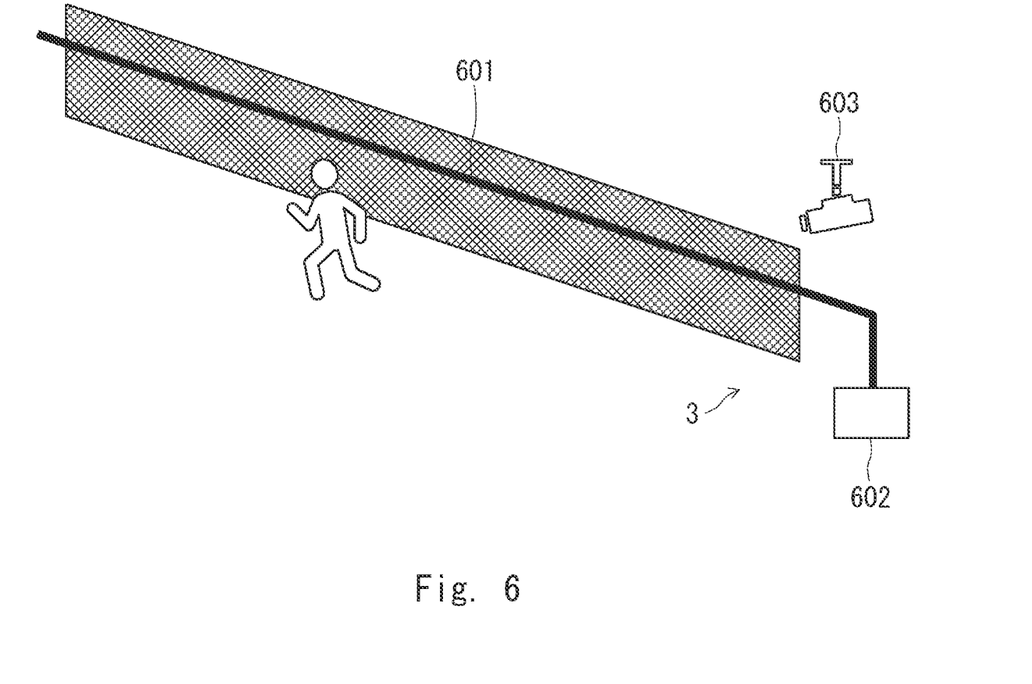
FIG. 6 is a schematic diagram illustrating an application example of an optical fiber sensor according to a third example embodiment.

An application example of an optical fiber sensor according to a third example embodiment will be described using the drawings. FIG. 6 is a schematic diagram illustrating an application example of the optical fiber sensor according to the third example embodiment.

An optical fiber cable 601 is an optical fiber cable 601 that is installed along a border. The optical fiber cable 601 may be newly installed for the purpose of sensing, or, when an existing optical fiber cable 601 for data communication is available, the existing optical fiber cable 601 may be used.

An optical fiber sensor 3 including the optical fiber cable 601 and a device body 602 is attached to a border fence or is laid under the ground along the border.

The optical fiber sensor 3 is capable of detecting environmental change in vibration, sound, or the like generated by intrusion of an intruder. The distance of a border is long, and it is difficult to constantly monitor the whole distance, using monitoring cameras 603. The optical fiber sensor 3 can be used for a complimentary purpose to such a monitoring system. Through use of a method proposed herein, it is possible to provide accurate location information of an intrusion event that occurs at the border. The other constituent components are the same as those in the first example embodiment and the second example embodiment.

Fourth Example Embodiment

Figure 7:
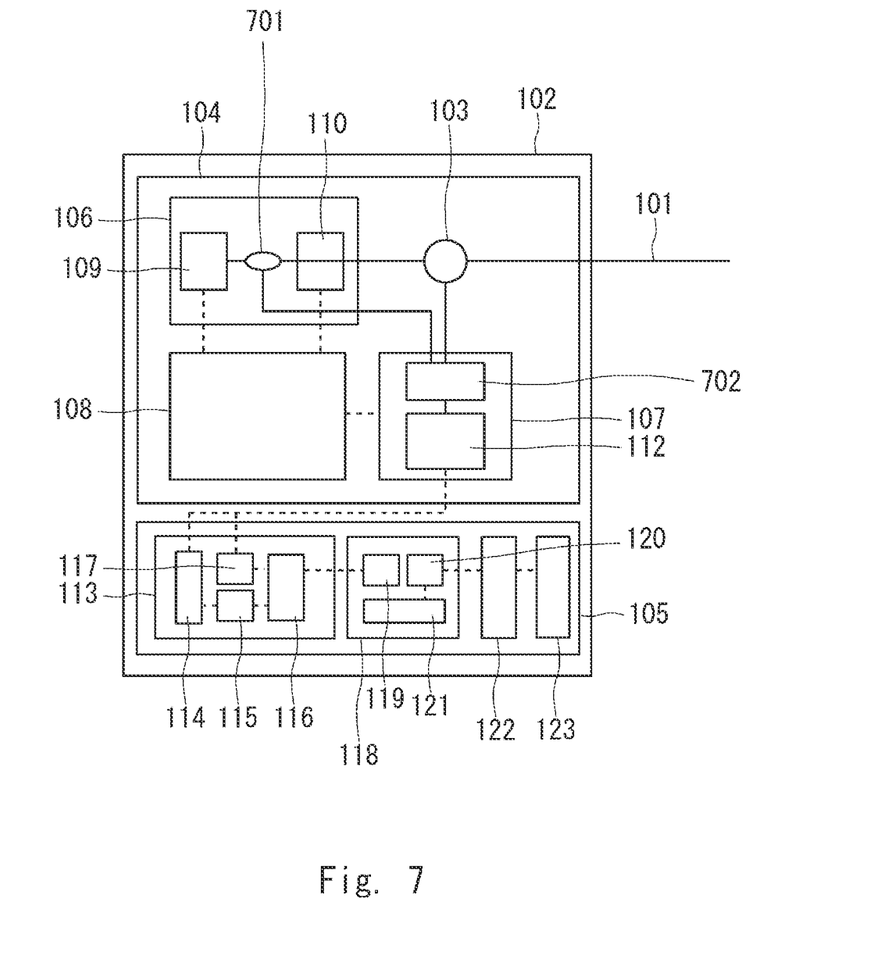
FIG. 7 is a block diagram schematically illustrating a configuration of an optical fiber sensor according to a fourth example embodiment.

An optical fiber sensor according to a fourth example embodiment will be described using the drawings. FIG. 7 is a block diagram schematically illustrating a configuration of the optical fiber sensor according to the fourth example embodiment.

The fourth example embodiment is a variation of the first example embodiment and is an example embodiment in which an optical coupler 701 is disposed in a light path between a light emitting element 109 and an optical modulator 110, an optical coherent receiver 702 is used in place of an optical detector 111, and the optical coupler 701 and the optical coherent receiver 702 are connected to each other by a light path.

The optical coupler 701 is a component that splits an optical pulse output from the light emitting element 109 into two optical pulses. One of the optical pulses into which an optical pulse is split by the optical coupler 701 is output to the optical modulator 110 and the other of the optical pulses is output to the optical coherent receiver 702 of a reception unit 107.

The optical coherent receiver 702 is a device configured to measure reflected and scattered light by a digital coherent detection method. The digital coherent detection method is a reception method of, by performing processing in a digital domain in an adaptive manner to variation in phase and polarization, measuring reflected and scattered light with high sensitivity and low noise. To the optical coherent receiver 702, two rays of light, namely optical pulses from the optical coupler 701 and backscattered light from the optical circulator 103, are input. In the backscattered light, a frequency shift has occurred by optical pulses being modulated by the optical modulator 110. Thus, to the optical coherent receiver 702, rays of light the frequencies of which are different from each other are input at the same time. The optical coherent receiver 702 measures a beat frequency generated by interference between the two optical signals (optical pulses and backscattered light) the frequencies of which are different from each other. The beat frequency measured by the optical coherent receiver 702 is output to the digital processing circuit 112 as analog data relating to backscattered light. Reception timing of backscattered light received by the optical coherent receiver 702 is synchronized with transmission timing of optical pulses output from the light emitting element 109, controlled by a control unit 108. The other constituent components and operation are the same as those in the first example embodiment.

According to the fourth example embodiment, as with the first example embodiment, the present invention is capable of contributing to identification of a location at which an environmental change has occurred, using an optical fiber cable. In addition, it is possible to measure reflected and scattered light with high sensitivity and low noise by measuring the reflected and scattered light, using the digital coherent detection method, and it is possible to recognize a situation of environmental change in detail by measuring change in the intensity and phase of backscattered light.

Note that the present invention is not limited to the above-described example embodiments and can be changed appropriately without departing from the spirit and scope of the present invention.

For example, a combination of the respective configurations of the first to fourth example embodiments is also included in the scope of the technological concept of the present invention. In addition, a sensing location correction program that causes a computer to perform a sensing location correction method according to the first to fourth example embodiments is also included in the scope of the technological concept. All or part of the example embodiments described above may be described as in the following Supplementary Notes, but the present invention is not limited thereto.

(Supplementary Note 1)

A sensor, the sensor being an optical fiber sensor configured to cause an optical pulse signal to be incident on an optical fiber cable and identify, from intensity change of backscattered light and an arrival time of the backscattered light, an environmental change having occurred and an occurrence location of the environmental change, the sensor performing correction of a sensing location, based on environmental change information acquired in sensing and installation location information of the fiber cable.

(Supplementary Note 2)

The sensor according to Supplementary Note 1, the sensor being an optical fiber sensor configured to cause an optical pulse signal to be incident on an optical fiber cable and identify, from intensity change of backscattered light and an arrival time of the backscattered light, an environmental change having occurred and an occurrence location of the environmental change, in which the correction of the sensing location uses location information of a location at which vibration characteristics change caused by a structure, such as a bridge section and a tunnel, present on a road or a railroad track.

(Supplementary Note 3)

The sensor according to Supplementary Note 1, the sensor being an optical fiber sensor configured to cause an optical pulse signal to be incident on an optical fiber cable and identify, from intensity change of backscattered light and an arrival time of the backscattered light, an environmental change having occurred and an occurrence location of the environmental change, in which the correction of the sensing location uses location information of a location at which vibration characteristics change, the vibration characteristics being generated by a mobile object, such as a vehicle and a train, depending on a pavement state or a joint of a railroad track or a road.

(Supplementary Note 4)

The sensor according to Supplementary Note 2 or 3, the sensor being an optical fiber sensor configured to cause an optical pulse signal to be incident on an optical fiber cable and identify, from intensity change of backscattered light and an arrival time of the backscattered light, an environmental change having occurred and an occurrence location of the environmental change, in which change in vibration characteristics serving as location information, the change being acquired by sensing, is determined using signal intensity of traveling vibration generated by a mobile object, noise intensity, or a ratio of the signal intensity to the noise intensity, as a threshold value.

(Supplementary Note 5)

The sensor according to Supplementary Note 1, the sensor being an optical fiber sensor configured to cause an optical pulse signal to be incident on an optical fiber cable and identify, from intensity change of backscattered light and an arrival time of the backscattered light, an environmental change having occurred and an occurrence location of the environmental change, in which the correction of the sensing location uses a change point in a traveling vibration trajectory of a mobile object, the change point depending on a cable installation environment including a housing unit for extra length of the optical fiber cable.

(Supplementary Note 6)

The sensor according to Supplementary Note 5, the sensor being an optical fiber sensor configured to cause an optical pulse signal to be incident on an optical fiber cable and identify, from intensity change of backscattered light and an arrival time of the backscattered light, an environmental change having occurred and an occurrence location of the environmental change, in which change in the traveling vibration trajectory of the mobile object, the change depending on the cable installation environment, is determined using a slope of traveling distance with respect to time as a threshold value.

(Supplementary Note 7)

A sensor, the sensor being an optical fiber sensor configured to cause an optical pulse signal to be incident on an optical fiber cable and identify, from intensity change of backscattered light and an arrival time of the backscattered light, an environmental change having occurred and an occurrence location of the environmental change, the optical fiber sensor including a sensor unit, the sensor unit having a transmission and reception function of an optical pulse, and an analysis unit configured to analyze data acquired by the sensor unit, in which the sensor unit includes a transmission unit configured to generate the optical pulse, a reception unit configured to receive backscattered light, and a control unit configured to control the transmission unit and the reception unit, and the analysis unit includes a vibration detection unit configured to detect vibration from chronological change of received signal intensity, a location correction processing unit configured to calculate a boundary location at which vibration characteristics change, and a normalization processing unit configured to suppress variation in output signal intensity.

(Supplementary Note 8)

The sensor according to Supplementary Note 7, the sensor being an optical fiber sensor configured to cause an optical pulse signal to be incident on an optical fiber cable and identify, from intensity change of backscattered light and an arrival time of the backscattered light, an environmental change having occurred and an occurrence location of the environmental change, in which change in vibration characteristics acquired by the sensor unit is determined with signal intensity, noise intensity, or a ratio of the signal intensity to the noise intensity used as a reference.

(Supplementary Note 9)

The sensor according to Supplementary Note 7, the sensor being an optical fiber sensor configured to cause an optical pulse signal to be incident on an optical fiber cable and identify, from intensity change of backscattered light and an arrival time of the backscattered light, an environmental change having occurred and an occurrence location of the environmental change, in which change in vibration characteristics acquired by the sensor unit is determined with a slope of a traveling vibration trajectory of a mobile object with respect to time and distance used as a reference.

REFERENCE SIGNS LIST

1 Optical fiber sensor
101 Optical fiber cable
102 Device body
103 Optical circulator
104 Sensor unit
105 Analysis unit
106 Transmission unit
107 Reception unit
108 Control unit
109 Light emitting element
110 Optical modulator
111 Optical detector
112 Digital processing circuit
113 Vibration detection unit
114 Parallel processing unit
115 Integration unit
116 Variation amount calculation unit
117 Occurrence area estimation unit
118 Location correction processing unit
119 Boundary location estimation unit
120 Location correction unit
121 Actual location information unit
122 Normalization processing unit
501, 601 Optical fiber cable
502, 602 Device body
503, 603 Monitoring camera
504 Vibration sensor
701 Optical coupler
702 Optical coherent receiver

What is claimed is:

1. An optical fiber sensor comprising:
an optical fiber cable,
a device body configured to cause an optical pulse signal to be incident on the optical fiber cable and identify, from intensity change of backscattered light of the incident optical pulse signal and an arrival time of the backscattered light, a prescribed environmental change having occurred in a vicinity of the optical fiber cable and an occurrence location of the environmental change,
wherein the device body performs correction of a sensing location on the optical fiber cable, based on environmental change information including the identified occurrence location and installation location information of the optical fiber cable,
wherein the correction of the sensing location uses a location of change in vibration characteristics derived from the intensity change caused by an installation state of the optical fiber cable including a housing for extra length of the optical fiber cable, the environmental change information and the location of change in the vibration characteristics include a change point of a trajectory in traveling vibration generated by a mobile object, wherein the change point is determined using a prescribed value of a slope of travel distance with respect to time as a threshold value.

2. A monitoring system comprising:
the optical fiber sensor according to claim 1; and
a monitoring camera or a point vibration sensor configured to sense a point-like location.

3. An optical fiber sensor comprising:
an optical fiber cable,
a device body configured to cause an optical pulse signal to be incident on the optical fiber cable and identify, from intensity change of backscattered light of the incident optical pulse signal and an arrival time of the backscattered light, a prescribed environmental change having occurred in a vicinity of the optical fiber cable and an occurrence location of the environmental change, wherein
the device body includes a sensor unit configured to transmit and receive the optical pulse signal and an analysis unit configured to analyze data acquired by the sensor unit,
the sensor unit includes:
a transmitter that generates the optical pulse signal;
a receiver that receives the backscattered light; and
a controller that controls the transmitter and the receiver, and
the analysis unit includes:
a vibration detector that detects vibration of the optical fiber cable from chronological change of the intensity change and simultaneously detect the occurrence location from the amount of variation in the vibration; and
a location correction processor having installation location information of the optical fiber cable and performing correction of a sensing location on the optical fiber cable, based on environmental change information including the occurrence location detected by the vibration detector and the installation location information,
wherein the correction of the sensing location uses a location of change in vibration characteristics derived from the intensity change caused by an installation state of the optical fiber cable including a housing for extra length of the optical fiber cable, the environmental change information and the location of change in the vibration characteristics include a change point of a trajectory in traveling vibration generated by a mobile object,
wherein the change point is determined using a prescribed value of a slope of travel distance with respect to time as a threshold value.

* * * * *